Dec. 16, 1969  N. W. SADLER III  3,484,267
SHINGLES RESISTANT TO DISCOLORATION BY MICROORGANISMS
Filed Nov. 22, 1966

INVENTOR.
NOAH W. SADLER III
BY
ATTORNEY

United States Patent Office 3,484,267
Patented Dec. 16, 1969

3,484,267
SHINGLES RESISTANT TO DISCOLORATION
BY MICROORGANISMS
Noah W. Sadler III, Montclair, N.J., assignor, by mesne assignments, to The Celotex Corporation, a corporation of Delaware
Filed Nov. 22, 1966, Ser. No. 596,197
Int. Cl. B44c *1/10*; C03c *3/00*
U.S. Cl. 117—25                                    4 Claims

ABSTRACT OF THE DISCLOSURE

A shingle, or weather exposed covering, comprises a base with a strip of fine granular zinc alloyed with a minor amount of another elemental metal. The strip about one-eighth to one inch in width is located at the top of the exposed portion of the shingle.

---

This invention relates to shingles and other forms of surface covering building materials for roofs, sidewalls and other exterior surfaces exposed to the weather. More particularly, this invention relates to protection of surface coverings of this kind afforded by introducing a property to the surface covering which inhibits the growth of microorganisms.

The present commercial market for white and pastel colored surface coverings, especially roofing shingles, is substantial. The growth of this market is hindered, however, because in many areas, dependent on ambient conditions, these shingles develop unsightly staining that darkens the color in streaks and large areas of a roof. This discoloration appears to be caused by biodeterioration, a term which refers to the impairment of physical appearance by biological means, i.e. through deposition and development of various biological microorganisms and their residues, e.g. bacteria, algae, fungi (a term which includes mildew and mold), yeast and the like. This biodeterioration which takes the form of microorganism colonies results in the development of dark bodies which, while differing in species in some respects, have the appearance of black bodies whose composition is not definite but is considered to include in varying amounts one or more of algae, fungi, bacteria, yeast and the like. This condition of darkening in the relatively early life of these materials is obviously unsightly and has resulted in the rejection by builders and property owners of otherwise attractive surfacing materials. It is particularly distasteful in connection with white and pastel colored roof shingles. As long as these light colored shingles are unattacked they are most attractive for their pleasing color and their greater reflection of heat and light when compared with dark colored shingles.

It is a primary object of the invention to provide a surface covering, e.g. a roof shingle, for the construction industry comprising a composition that incorporates a reservoir of ingredients which will effectively inhibit biodeterioration and consequent discoloration of the surface material.

It is a more specific object of the invention to provide a shingle which is provided with a band or strip of substance at the upper exposed edge of the shingle which by the weathering process corrodes and then erodes to provide a long-lasting supply of microorganism poisoning substance to protect the surface against the growth of ever present airborne microorganisms over a period of many years.

It is still a further object of the invention to provide a shingle resistant to microorganisms which is characterized by an aesthetically improved appearance.

Additional objects and advantages will become apparent to one skilled in the art from the definitive description provided hereinbelow taken in conjunction with the annexed drawing which forms a part of the disclosure and wherein.

Figure 1:
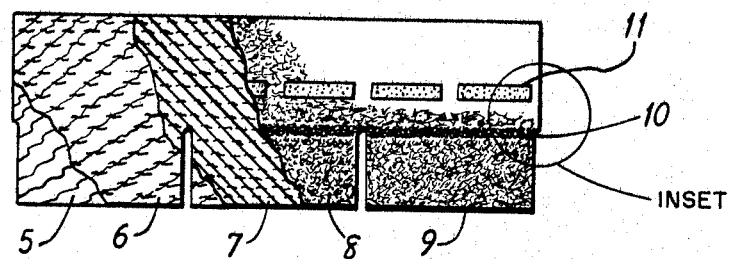
FIG. 1 is a plan view of an individual shingle unit or strip manufactured in accordance with the invention.
Figure 3:
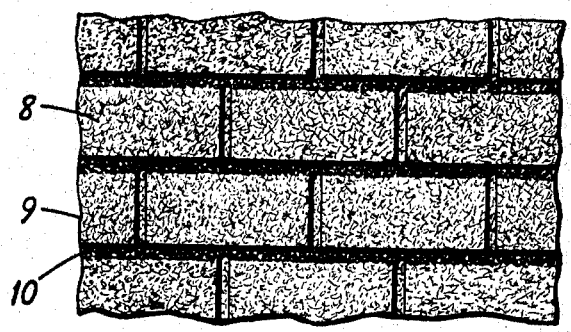
FIG. 3 is a segment of a building surface showing a partial assemblage of the shingles of the invention.
Figure 2:
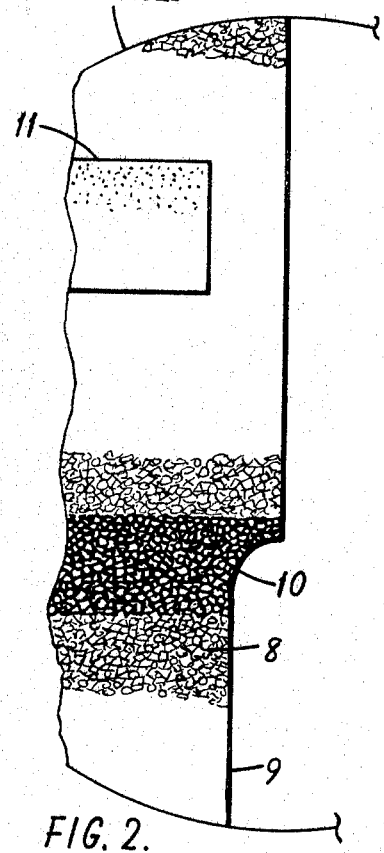
FIG. 2 is a fragmentary segment from FIG. 1 enlarged to depict the structure in better detail.

Broadly stated, the invention comprises providing a surface covering which incorporates an inhibitor to safeguard against biodeterioration. This effect may be obtained either by a uniform blend of granules which are substantially the same size as the mineral granules in the surface composition exposed to the weather or by applying a weather corrodable strip of microorganism growth-inhibiting substance at the upper edge of a shingle or similar building surface covering article so that a long-lasting supply of microorganism growth-inhibiting substance is furnished by erosion and is maintained on the exposed shingle surface, thereby inhibiting the biodeterioration which mars the appearance of shingles. When a strip rather than a homogeneous blend is used, the strip is positioned so that it produces an aesthetic effect in addition to a primarily function advantage, i.e. the strip is located at a position which creates the illusion that a thicker (than actual) shingle butt is casting a shadow, while it is also located at the uppermost exposed part of the shingle where corrosion products sweep over the shingle as it weathers.

Referring to the drawings, the invention is applied to a roofing shingle of generally conventional construction and size comprising a felt base 5 upon which is applied a saturant or impregnant such as asphalt. A saturated portion is depicted as area 6. The saturant essentially entirely permeates the felt base. Applied over the impregnated base is a waterproof coating, e.g. an asphaltum composition, depicted at 7, upon which is then applied a surfacing of mineral granules, depicted at 8, which completes the conventional shingle.

The invention is particularly advantageous in connection with shingles which have white or light colored granules. Even with darker color shingles, however, a definite marring of the surface appearance is noticeable more by a variation in texture rather than a difference in color. Thus, even with darker shingles, the advantage of inhibited biodeterioration provided by the concept of the invention is substantial.

Referring again to the drawing, a relatively narrow horizontal area, i.e. a band or strip 10 of weather errodable composition, preferably of a substance providing a granular size substantially the same as that of the mineral granules is provided at a location on the shingle which places the strip contiguous to the top of the exposed part of the shingle tab 9. As the shingle is washed when weathered, it corrodes and the subsequent erosion carries the compounds toxic to microorganisms over the exposed face of the shingle providing long lasting protection against biodeterioration. Conventional strips of adhesive 11 function to seal each shingle to the one above it generally upon being activated by heat, e.g. the sun's rays.

The dark stains common on roofs in the Southeast and other humid areas are the result of microorganism growth starting in a few colonies and ultimately covering the entire roof. Biodeterioration inhibitors added to the surface covering, e.g. asphalt shingles in accordance with the invention inhibit growth of the airborne microorganisms, thus preventing the widespread, unsightly darkening. In keeping with the invention, properly selected inhibitors which are capable of furnishing a long-lasting "reservoir" of growth inhibitor, i.e. a long-lasting source of inhibitor product by weathering action on the exposed surfacing article, preclude the growth of microorganisms by interfering with their development processes. While any antibiodeterioration compound whether organic or inorganic in solid form, or capable of being rendered solid upon application on the surfacing materials and recognized as an effective inhibitor by those skilled in the art of microbiology may be utilized, it will be apparent that those substances toxic to humans in the environment and concentration in which they are to be used, are to be avoided.

Illustrative compositions which may be used to inhibit biodeterioration include various bactericides, fungicides, algicides, mildewicides, bacteriastats, fungistats, antimicrobial compounds and the like.

Suitable inhibitors comprise any of a wide variety of microorganism toxic substances, including inorganic and organic compounds such as metal, organo metallics and organic compounds, e.g. zinc, copper, tin, lead, mercury, titanium cadmium, boron, arsenic, selenium and their alloys, tert-butyl tin oxide, mercury salts such as phenyl mercuric acetate, propionate, or benzoate, phenyl mercuric sulfide, iodoacetamide, hexachlorobenzene, polyacridine and the like, and blends and mixtures thereof which when in situ erode at a relatively slow rate. I have discovered that granules of zinc are a particularly preferred choice for several reasons. Zinc granules are easily introduced into the shingle making process generally employing the same technology used in handling mineral granules. The use of zinc as the growth inhibitor does not introduce a hazardous material at any stage in the handling or manufacturing or in the finish product. The corrosion products of zinc are light colored and introduce no complications in obviating the staining problem which is of especial value with respect to white or light color shingles which comprise a substantial segment of the modern roofing market.

The desired placement of the metal granules is in the form of a strip about one-half inch wide, referred to herein as a "shadow band," at the upper exposed portion of the shingle tab. At this location the metal granules serve two purposes: their dark color creates the illusion that a thicker (than actual) shingle butt is casting a shadow; and the drainage of water over the band thus located carries the zinc compounds over the balance of the exposed tab.

The invention will be further described by the following specific examples. It will be understood, however, that although these examples may described in detail certain preferred operating conditions of the invention, they are given primarily for purpose of illustration only and the invention in its broader aspects is not limited thereto.

EXAMPLE 1

Shingles of conventional commercial dimension of the kind depicted in the accompanying drawing were prepared with about a one inch strip of essentially a single layer of metallic zinc granules at the upper exposed edge of the tab. The size of the granules did not exceed about three-sixteenths inch in diameter.

Mineral granules from the exposed surface below the zinc strip of shingles which were weathered in the South, and others weathered in the laboratory, were then washed with acid (1 N HCl) and found to contain zinc by atomic absorption spectroscopy.

The width of the band can, of course, be varied over a fairly broad range but generally with conventional shingles a width in the range of from about one-eighth inch to about one inch is utilized.

The microorganism growth inhibiting compounds which, as noted hereinabove, include both organic and inorganic compounds and may be obtained from any commercial source of varying composition are available commercially and depending on the particularly ambient condition in a given geographical area, an alloy rather than pure metal may be advantageous. For example, because of the rate of erosion, the compound whether organic or inorganic should preferably be in the form susceptible to gradual dissolution when weathered so as to provide a steady supply of the inhibitor (which prevents biodeterioration) on the exposed surface. As a particular alloy, zinc granules comprising a porous form having a large surface-to-volume ratio with a desirable chemical alloy containing 96% zinc provide an excellent long-lasting and effective shadow band composition. The alloyed impurities in the zinc, which may be of a variety of composition, e.g. copper, iron, lead, etc., appear to produce a more reactive form of zinc than a very high purity made of zinc. The granules for aesthetic appearance may be held to the same size specification as the mineral granules which cover the major area of the exposed shingle surface area. The surface area and irregular shape of granules of this approximate size is an aid to formation of the growth inhibiting zinc compounds resulting from the weather corrosion of the granules.

EXAMPLE 2

Test shingles having a ½ inch zinc metal granule shadow band at the top of the exposed tab, as shown in the drawing, and made in plant runs, were placed in growth infested roofs in nine localities of the Southeast during a two-year project period. A zinc granule of the kind described in Example 1 was applied. Field tests in the South are considered the most reliable method of testing because of the many factors involved (organism types and concentration; climatic moisture, temperature and light) and the high incidence of normal discoloration of shingles by microorganism attack. Three approaches are used: (1) addition of test shingles to a darkened roof, i.e. a roof already substantially discolored from biodeterioration; (2) interleaving of test shingles with darkened (microorganism attacked) shingles in test station racks; (3) complete roof installations in problem areas of the South using test shingles and controls but no darkened shingles.

Shingles with zinc granules in a shadow band have been placed on roofs in the South. Samples removed after 1 to 1½ years show no significant growth in any of the "treated" or control shingles as compared to very substantial biodeterioration prevalent with conventional shingles.

EXAMPLE 3

Test shingles were prepared following essentially the procedure of Example 2 except that zinc granules were applied as a uniform blend (12:1 ratio by weight of mineral granules to 1 zinc granule) instead of applying the zinc granules as a shadow band. The shingles were similarly applied in the same test areas and showed no significant growth, i.e. discoloration, after the same period.

EXAMPLE 4

The procedure of Example 2 was essentially repeated with the exception that the following compounds were used alternately in the growth inhibiting strip applied at the upper exposed part of the shingle:

(a) cupric carbonate
(b) copper arsenate
(c) tert-butyl tin oxide
(d) titanium sulfate
(e) hexachlorobenzene.

In each case, the resistance against biodeterioration compared to the untreated control was apparent.

Observation of biodeteriorated specimens indicates that the overall darkening effect is largely caused by dried, darkened algae adhering to the granules. Upon wetting, these algae swell and frequently become attached to an air or gas bubble which lifts some of the algae from the surface and carries it to another area lower on the roof slope. The swollen algae appear to be fairly mobile when wet, while in the dry state they adhere rather firmly to the exposed surface, either asphalt or granule.

Laboratory cultures of fungi have also been prepared and applied to evaluate effects of shingle treatments with inhibititors on fungus growth. The test shingles were artificially weathered as indicated in a Weather-Ometer in order to provide the effect of inhibitor salt formation and washing the inhibitor over the mineral granules for comparison thereof with controls. The zinc granules afford excellent protection of the mineral granules against growth in these tests. Organic and organo metallic, as well as metallic, microorganism growth inhibitors tested have demonstrated substantial effectiveness.

Also, infected shingles taken from roofs were submitted to the laboratory and independently to a private laboratory for culture preparation and microscopic examination. Various microorganisms including fungi, yeast and bacteria were found in cultures of the infested shingle not treated with inhibitors while no significant amounts were present in the inhibitor containing shingles.

It will be apparent that various modifications may be effected without departing from the scope of the invention and the several details disclosed as illustrative are not to be construed as placing limitations on the invention.

I claim:
1. An article of construction comprising a surface covering which is exposed to the weather, said surface covering comprising a base of fibrous material saturated with a binder, a mastic coating on the weather exposed side of said article, mineral granules substantially embedded in and surfacing said coating, said surfacing further having a strip of fine, granular biodeterioration inhibiting substance across a portion of said surface covering, said biodeterioration inhibiting substance being an alloy of zinc in which metallic zinc comprises about 96% of said substance and the remainder of said alloy is selected from the group of elemental metals consisting of copper, lead, iron, and tin.

2. The article of claim 1 in which said strip is between one-eighth and one inch in width.

3. The article of claim 2 in which said strip is located at the top of the exposed portion of said surface covering.

4. The article of claim 2 in which said granules of biodeterioration inhibiting substance are of substantially the same size as said mineral granules.

References Cited

UNITED STATES PATENTS

| 1,574,615 | 2/1926 | Fleming | 117—31 |
| 1,720,708 | 7/1929 | Young | 117—31 |
| 1,920,931 | 8/1933 | Finley | 117—31 |
| 2,206,915 | 7/1940 | Ochs | 117—24 |

FOREIGN PATENTS

| 1,466 | 5/1862 | Great Britain. |
| 193,006 | 11/1923 | Great Britain. |
| 211,128 | 11/1924 | Great Britain. |

OTHER REFERENCES

Salvin, S. B., "Influence of Zinc Oxide on Paint Molds," Ind. & Eng. Chem., April 1944, vol. 36, No. 4, pp. 336–340.

Block, S. S., "Chemicals for Fungus Control," Chemical Week, Jan. 26, 1952, pp. 21–31.

WILLIAM D. MARTIN, Primary Examiner

RAYMOND M. SPEER, Assistant Examiner

U.S. Cl. X.R.

117—31, 32